US012565880B2

(12) United States Patent
Onodera et al.

(10) Patent No.: US 12,565,880 B2
(45) Date of Patent: Mar. 3, 2026

(54) COMPRESSOR

(71) Applicant: Hitachi Industrial Equipment Systems Co., Ltd., Tokyo (JP)

(72) Inventors: Tasuku Onodera, Tokyo (JP); Yoshio Kobayashi, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 124 days.

(21) Appl. No.: 17/795,073

(22) PCT Filed: Dec. 1, 2020

(86) PCT No.: PCT/JP2020/044591
§ 371 (c)(1),
(2) Date: Jul. 25, 2022

(87) PCT Pub. No.: WO2021/240846
PCT Pub. Date: Dec. 2, 2021

(65) Prior Publication Data
US 2023/0087184 A1     Mar. 23, 2023

(30) Foreign Application Priority Data
May 28, 2020     (JP) ................................. 2020-093642

(51) Int. Cl.
*F04B 53/16*         (2006.01)
*F04B 39/00*         (2006.01)
(Continued)

(52) U.S. Cl.
CPC ............. *F04B 39/0005* (2013.01); *F16J 9/26* (2013.01); *F04B 39/12* (2013.01)

(58) Field of Classification Search
CPC .................................... F04B 39/12; F16J 9/26
See application file for complete search history.

(56) References Cited

U.S. PATENT DOCUMENTS 6,156,428 A * 12/2000 Gibson ............. G11B 5/70615
6,357,755 B1     3/2002 Feistel
(Continued)

FOREIGN PATENT DOCUMENTS

CA       2 418 005 A1     3/2002
CN       103151134 A     6/2013
(Continued)

OTHER PUBLICATIONS

English Translation of JP2018066427A (Year: 2018).*
(Continued)

*Primary Examiner* — Connor J Tremarche
(74) *Attorney, Agent, or Firm* — Crowell & Moring LLP

(57)         ABSTRACT

Provided is a compressor including a sliding material with the wear resistance improved. To solve this problem, a compressor (40) includes: a compression chamber (43) that is formed in a cylinder (41) and compresses gas; and a piston ring 421 and a rider ring 422 that are in contact with the inner wall of the cylinder 41 to form the compression chamber (43). The piston ring 421 and rider ring 422 include: a resin member; and a metal particle that is located within the resin member and includes a surface layer containing an affinity portion having an affinity to the resin member.

13 Claims, 12 Drawing Sheets

(51) Int. Cl.

| | |
|---|---|
| *F04B 53/22* | (2006.01) |
| *F16J 9/26* | (2006.01) |
| *F04B 39/12* | (2006.01) |

(56) References Cited

U.S. PATENT DOCUMENTS

| | | | | |
|---|---|---|---|---|
| 6,582,763 B1 * | 6/2003 | Nishimura | ............... | B22F 1/16 |
| | | | | 427/576 |
| 2003/0209297 A1 * | 11/2003 | Fujita | ..................... | F16C 33/14 |
| | | | | 148/513 |
| 2010/0261625 A1 * | 10/2010 | Hakamata | ............. | F16C 33/208 |
| | | | | 508/108 |
| 2017/0012280 A1 * | 1/2017 | Ueda | ..................... | H01M 4/364 |
| 2017/0030343 A1 | 2/2017 | Okasaka et al. | | |
| 2017/0218954 A1 * | 8/2017 | Nishimura | ............. | C22C 21/02 |

FOREIGN PATENT DOCUMENTS

| | | |
|---|---|---|
| DE | 100 42 464 A1 | 3/2002 |
| EP | 0 933 566 A1 | 8/1999 |
| JP | 2004-277610 A | 10/2004 |
| JP | 2011-179392 A | 9/2011 |
| JP | 2015-200339 A | 11/2015 |
| JP | 2015-203390 A | 11/2015 |
| JP | 6005312 B1 | 10/2016 |
| JP | 2018066427 A * | 4/2018 |
| WO | WO 2019/198311 A1 | 10/2019 |
| WO | WO 2019/208031 A1 | 10/2019 |

OTHER PUBLICATIONS

Chinese-language Office Action issued in Chinese Application No. 202080095114.2 dated Mar. 24, 2023 with English translation (19 pages).

International Search Report (PCT/ISA/210) issued in PCT Application No. PCT/JP2020/044591 dated Feb. 9, 2021 with English translation (four (4) pages).

Japanese-language Written Opinion (PCT/ISA/237) issued in PCT Application No. PCT/JP2020/044591 dated Feb. 9, 2021 (three (3) pages).

Chinese-language Office Action issued in Chinese Application No. 202080095114.2 dated Sep. 28, 2023 with English translation (15 pages).

Extended European Search Report issued in European Application No. 20937982.5 dated May 27, 2024 (8 pages).

"Transition metal", Wikipedia, May 3, 2024, pp. 1-8, XP093158971 (8 pages).

Chinese-language Office Action issued in Chinese Application No. 202080095114.2 dated Feb. 20, 2024 with English translation (15 pages).

Wufeng, C. et al., "Section IV. Other coordination agents for epoxy adhesives", Handbook of adhesive Bonding, Feb. 1989, pp. 93-94, National Defense Industry Press with partial translation (5 pages).

* cited by examiner

EXAMPLE 1     0.5 mm

COMPARATIVE EXAMPLE 1     0.5 mm

COMPARATIVE EXAMPLE 2     0.5 mm

COMPRESSOR

TECHNICAL FIELD

The present invention relates to a compressor.

BACKGROUND ART

Generally used compressors to compress gas, such as air, are reciprocating compressors, scroll compressors, and the like. In a reciprocating compressor, for example, on a piston reciprocating inside a metallic cylinder, a piston ring is mounted as a sliding material that slides on the inner surface of the cylinder. In a scroll compressor, for example, at the end of a metallic fixed scroll and at the end of an orbiting scroll that orbits with respect to the fixed scroll while sliding thereon, tip seals are mounted as the sliding material.

Patent Literature 1 describes a scroll-type fluid machine including a fixed scroll and an orbiting scroll. The fixed scroll includes a spiral wrap section provided on a bottom-land surface of an end plate. The orbiting scroll is provided facing the fixed scroll and includes a spiral wrap section provided on a bottom-land surface of an end plate so as to form plural compression chambers between the wrap sections of the fixed and orbiting scrolls. In at least one of the wrap sections of the orbiting and fixed scrolls, a groove is formed that extends along the tip of the wrap section. Within the groove, a seal member (the sliding material) is mounted. The seal member is configured to come into sliding contact with the bottom-land surface of the opposite scroll. Furthermore, the seal member includes a soft layer and a filler layer that is a layer including a sliding contact surface portion of the seal member configured to come into sliding contact with the bottom-land surface of the opposite scroll and contains a hard filler having a hardness not smaller than the bottom-land surface.

CITATION LIST

Patent Literature

Patent Literature 1: JP2011-179392A

SUMMARY OF INVENTION

Technical Problem

According to the technique described in Patent Literature 1, the hard filler is likely to fall off the sliding material. If the sliding material slides on the fallen hard filler, the sliding material becomes worn due to the abrasive action.

An object to be solved by the present invention is to provide a compressor including a sliding material with the wear resistance improved.

Solution to Problem

A compressor according to the present invention includes: a compression chamber that is formed in a metal housing and is configured to compress gas; and a sliding material that is in contact with an inner wall of the metal housing to form the compression chamber. The sliding material includes: a resin member; and a metal particle that is located within the resin member and includes a surface layer containing an affinity portion having an affinity to the resin member. The other solutions are described later in Description of Embodiments.

Advantageous Effects of Invention

According to the present invention, it is possible to provide a compressor including a sliding material with the wear resistance improved.

DESCRIPTION OF EMBODIMENTS

Figure 1:
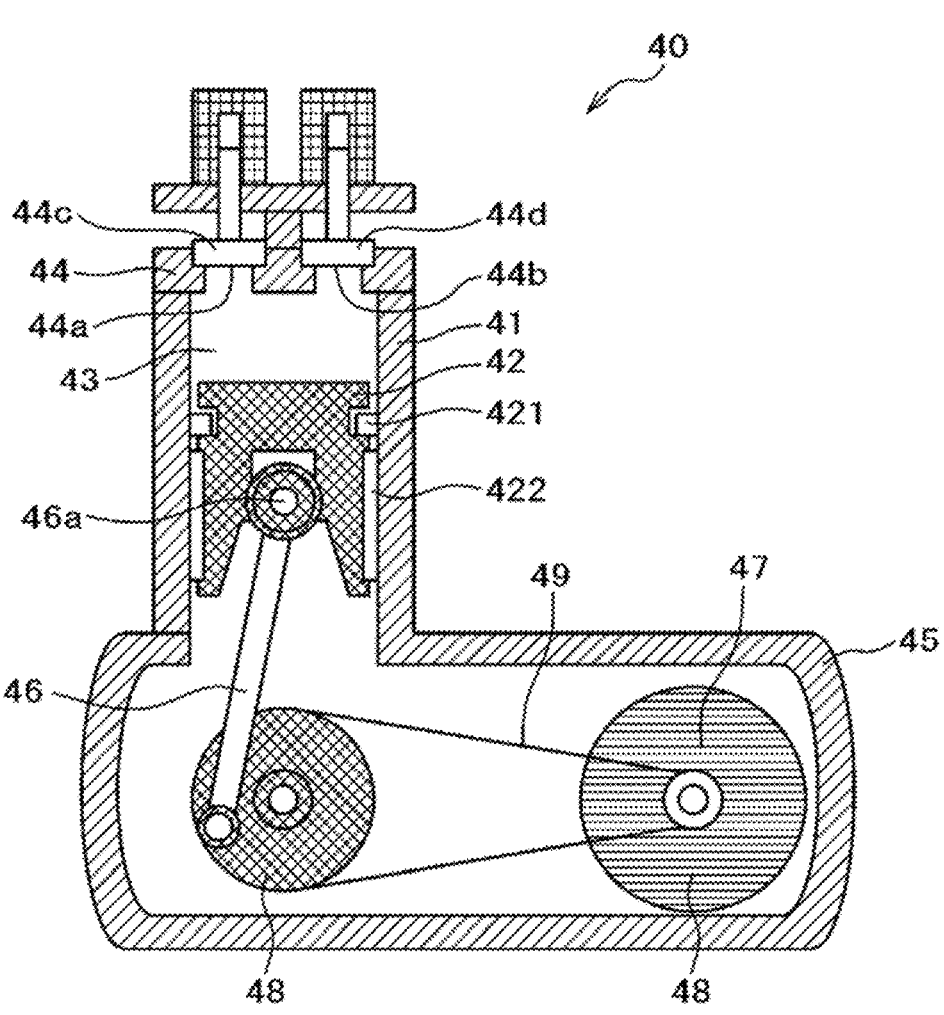
FIG. 1 is a sectional view showing the entire configuration of a reciprocating compressor.

Hereinafter, the present invention will be described. The present invention is not limited to the contents below and can be carried out in any modification without significant reduction in effects of the present invention. The present invention can be carried out in combination of different embodiments. In the following description, identical members in different embodiments are given identical reference numerals. The redundant description thereof is omitted, and different points are mainly described. Components including identical functions are given identical names. The drawings referred to are schematic and show components with the thickness and dimensions properly increased or reduced. Some components are omitted.

FIG. 1 is a sectional view showing the entire configuration of a reciprocating compressor 40. The compressor 40 is configured to compress gas. The gas is air, dry gas with an extremely small amount of water vapor, or the like, for example. The dry gas is a gas having a dew point of not higher than −30° C., for example. Specifically, examples of the dry gas are synthetic air, high-purity nitrogen gas, oxygen gas, helium gas, argon gas, and hydrogen gas.

The compressor 40 is an oil-free compressor. The compressor 40 uses no lubricant oil or does not use a sufficient amount of lubricant oil for a piston ring 421 and a rider ring 422 (described later). A sliding material 12, including the piston ring 421, the rider ring 422, and the like, has an excellent wear resistance, which is described in detail later. The compressor 40 therefore has an improved reliability without using lubricant oil.

The compressor 40 includes a cylinder 41 (a metal housing) made of metal and a piston 42 reciprocating within the cylinder 41. The piston 42 may be made of metal or made of resin. In a space defined by the piston 42 within the cylinder 41, a compression chamber 43 as an operating space to compress gas is formed. In the compression chamber 43, gas is compressed or expanded as the piston 42 is displaced.

The upper end of the cylinder 41 is closed by a partition plate 44. The partition plate 44 is provided with a suction port 44a and a discharge port 44b. The suction port 44a and discharge port 44b are provided with a suction valve 44c and a discharge valve 44d, respectively. The suction valve 44c and discharge valve 44d are coupled to tubes on the other side.

The cylinder 41 is open at the lower end and is coupled to a housing 45 made of metal, at this lower end. The piston 42 is coupled to a connecting rod 46 through a piston pin 46a. The housing 45 accommodates a motor 47 therein. The motor 47 is coupled to the connecting rod 46 through pulleys 48 and a belt 49 wound around the pulleys 48.

During operation of the compressor 40, power of the motor 47 is transmitted to the piston 42 by the connecting rod 46 through the belt 49 and pulleys 48. The piston 42 is moved up and down to suck outside air into the compression chamber 43 through the suction port 44a and compress the sucked gas within the compression chamber 43. The compressed gas is discharged out of the compression chamber 43 through the discharge port 44b to be delivered by the tube.

Figure 2:
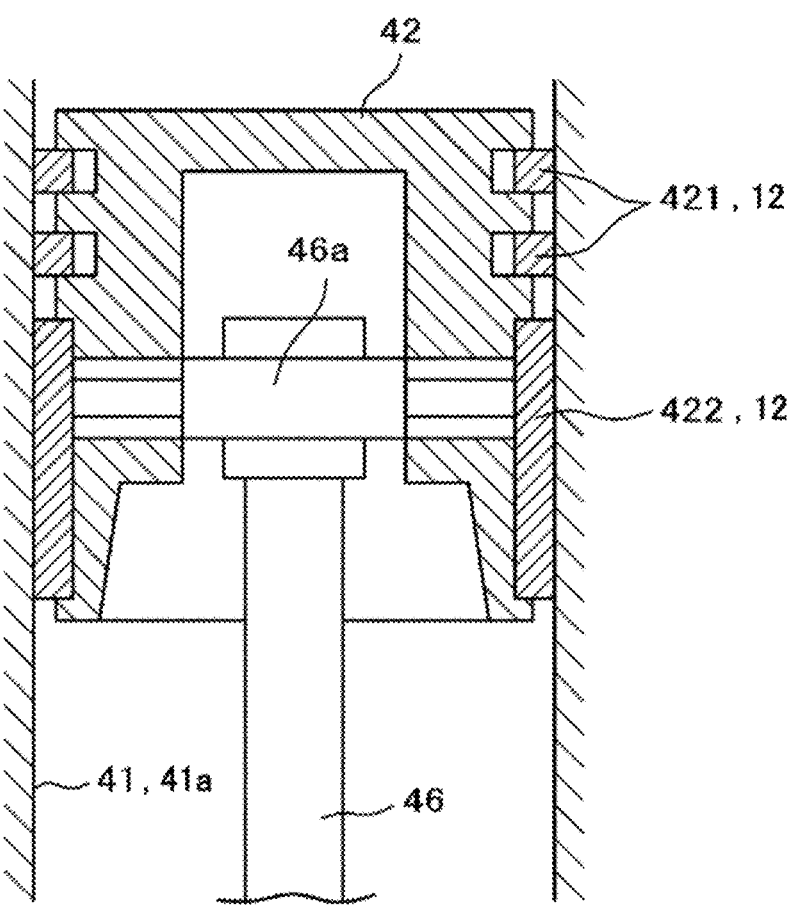
FIG. 2 is an enlarged view showing the configuration inside a cylinder.

FIG. 2 is an enlarged view showing the configuration within the cylinder 41. When the cylinder 41 is made of aluminum, for example, an inner wall 41a of the cylinder 41 includes an oxide coating 41b (FIG. 3), such as anodized aluminum.

Around the piston 42, the piston ring 421 and rider ring 422 are fitted. The piston ring 421 and rider ring 422 both are examples of the sliding material 12 that is in contact with the inner wall 41a of the cylinder 41 to form the compression chamber 43 (FIG. 1). As the piston 42 moves up and down, the piston ring 421 and rider ring 422 slide on the inner wall 41a of the cylinder 41. This prevents the piston 42 and cylinder 41 from coming into contact and galling, providing smooth slide of the piston 42 and cylinder 41 on each other.

Figure 3:
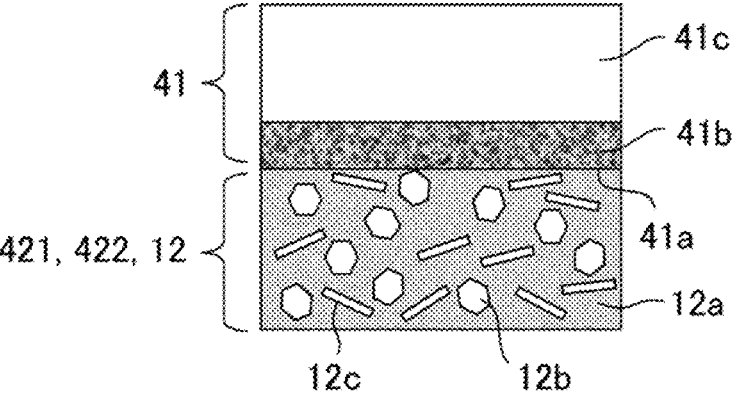
FIG. 3 is a sectional view showing a slide interface between a sliding material and an inner wall.

FIG. 3 is a sectional view showing a slide interface between the sliding material 12 including the piston ring 421 and rider ring 422 (or any one of the piston and rider rings 421 and 422) and the inner wall 41a. The sectional view in FIG. 3 shows a cutting plane perpendicular to the cutting direction in FIG. 2. The oxide coating 41b is formed on the surface of a cylinder body 41c. As the sliding material 12 slides on the inner wall 41a, the compression chamber 43 (FIG. 1) changes its volume. The sliding material 12 may be a lip ring that seals the compression chamber 43, which is not shown.

The cylinder body 41c is composed of light metal, such as aluminum, magnesium, or silicon, or a transition metal, such as iron, chromium, nickel, molybdenum, titanium, or copper, for example. Specifically, the cylinder body 41c may be composed of an aluminum material, such as aluminum or an aluminum alloy, an iron material, such as iron or an iron-nickel alloy, a titanium material, such as titanium or a titanium alloy, or a copper material, such as copper or a copper alloy, for example. Among these materials, the aluminum material having a great effect of wear resistance is particularly preferred. The aluminum material may contain a small amount of magnesium, silicon, or the like, for example. The iron material may contain chromium, nickel, molybdenum, or the like, for example.

The oxide coating 41b is a naturally oxidized film that is naturally formed in the cylinder body 41c or a surface coating artificially applied to the cylinder body 41c. As the naturally oxidized film, when the cylinder body 41c is made of an aluminum material, the oxide coating 41b is aluminum oxide (anodized aluminum). When the cylinder body 41c is made of iron, the oxide coating 41b is iron oxide, and when the cylinder body 41c is made of copper, the oxide coating 41b is copper oxide. As the surface coating, the oxide coating 41b is formed by plating, physical vapor deposition (PVD), chemical vapor deposition (CVD), carburizing, or the like and is composed of a material containing at least one of aluminum, phosphor, chromium, iron, nickel, and zinc. Examples of the surface coating containing such an element are aluminum anodizing, aluminum plating, nickel plating, chromium plating, iron plating, and zinc plating.

The sliding material 12 includes a resin member 12a, metal particles 12b each including a surface layer 12b2 (FIGS. 4A and 4B), and rod-shaped particles 12c. The metal particles 12b and rod-shaped particles 12c are, for example, dispersed in the resin member 12a to be located within the resin member 12a.

The resin member 12a is composed of, for example, a material having a lower hardness (softer) than the cylinder 41 (particularly the oxide coating 41b) and is a base material supporting the metal particles 12b and rod-shaped particles 12c. The hardness in this specification refers to a Vickers hardness measured based on JIS Z 2244:2009, for example. The resin member 12a may be composed of fluorine-based resin or any resin other than fluorine-based resin, for example. Fluorine-based resin can be at least one of polytetrafluoroethylene (PTFE), tetrafluoroethylene-perfluoroalkylvinylether copolymer (PFA), ethylene-tetrafluoroethylene copolymer (ETFE), polyvinylidene fluoride (PVDF), and the like, for example.

The resin other than fluorine-based resin can be at least one of ultra-high-molecular-weight polyethylene (UHMWPE), polyether ether ketone (PEEK), polyamide (PA), polyimide (PI), polyphenylene sulfide (PPS), polyacetal (POM), phenol resin, or the like, as well as modified products thereof, for example. The resin member 12a may be composed of a fluorine-based resin in combination with a resin other than fluorine-based resin.

Among these materials, the resin member 12a is preferably composed of a fluorine-based resin. Use of a fluorine-based resin improves the heat resistance of the sliding material 12. In the compressor 40 using a fluorine-based resin as the resin member 12a, wear of the sliding material 12 can be reduced even for a gas with a low dew point and a low humidity, such as high-purity nitrogen gas. The compressor 40 using a fluorine-based resin as the resin member 12a is thus able to compress various types of gas and have a longer maintenance cycle and a longer life.

Among fluorine-based resins, PTFE is preferred. PTFE has a high crystallinity and a low shear strength. When PTFE is subjected to shear, therefore, PTFE in the surface layer peels off easily at the micro level and is likely to transfer to the inner wall 41a of the cylinder 41. However, the sliding material 12 includes the metal particles 12b (described later) in addition to the resin member 12a, and the metal particles 12b, which are configured to have higher adhesion strength to PTFE, improves the wear resistance of PTFE. The wear resistance of the sliding material 12 can be therefore improved even when the resin member 12a is made of PTFE.

The metal particles 12b are configured to improve the wear resistance of the sliding material 12. The metal particles 12b may be either harder or softer than the cylinder 41 (the oxide coating 41b in particular). The metal particles 12b are dispersed at a proportion of not less than 0.01 g and not more than 10 g per 10 g of the resin member 12a, for example. The metal particles 12b may be amorphous particles not having a clear shape. The preferable shape thereof will be described with reference to FIGS. 4A and 4B.

Figure 4A:
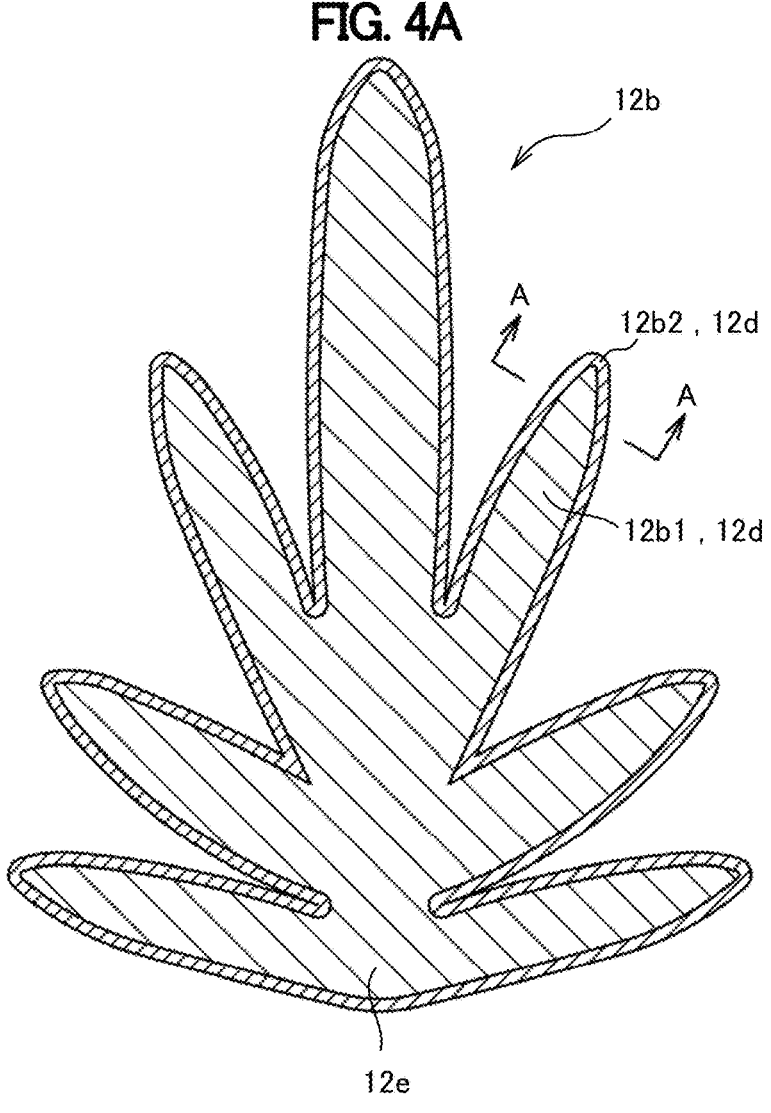
FIG. 4A is a sectional view of a dendritic metal particle.

FIG. 4A is a sectional view of a dendritic metal particle 12b. When the surface layer 12b2 of the metal particle 12b is a coupling layer (described later with reference to FIG. 7), the surface layer 12b2 does not have an identifiable thickness. However, the surface layer 12b2 is shown in the drawing with a certain degree of thickness, including that case, for convenience of illustration.

The dendritic shape refers to a shape including plural branches connected at the root, for example, and the branches have elongated shapes including rod-like, needle-like, columnar, and spindle-like shapes. In the example shown in the drawing, the metal particle 12b includes plural branches 12d and a connecting section 12e corresponding to the root connecting the plural branches 12d. The branches 12d are arranged so as to radiate from the connecting section 12e and each have a circular cross section with a diameter D (FIG. 4B), for example. The branches 12d are not limited to such a configuration. The branches 12d do not need to be elongated extremely, and the tips thereof do not need to be sharp.

The dendritic metal particle 12b can particularly improve the wear resistance of the sliding material 12. This is because the dendritic metal particle 12b has a large surface area. As the surface area of the metal particle 12b increases, the area of contact between the resin member 12a and the metal particle 12b increases, which can significantly reduce the frequency of the metal particles 12b falling off due to shear.

Each metal particle 12b includes a core 12b1 and the surface layer 12b2 formed on the surface of the core 12b1. The metal particle 12b is coated with the surface layer 12b2 in order to have a higher adhesion strength to the resin member 12a. The operation of the surface layer 12b2 is described later with reference to FIG. 7.

The core 12b1 is preferably composed of a material having a lower hardness than the inner wall 41a of the cylinder 41 (the oxide coating 41b shown in FIG. 3, for example). Specifically, the core 12b1 preferably has a Vickers hardness of not less than 0.1 and not more than 1 times that of the inner wall 41a, for example.

The preferable material of the core 12b1 is any material that has a lower hardness than the inner wall 41a of the cylinder 41. Examples thereof are copper, copper alloys (brass, bronze, and the like), ceramic, carbon materials, and the like.

Figure 7:
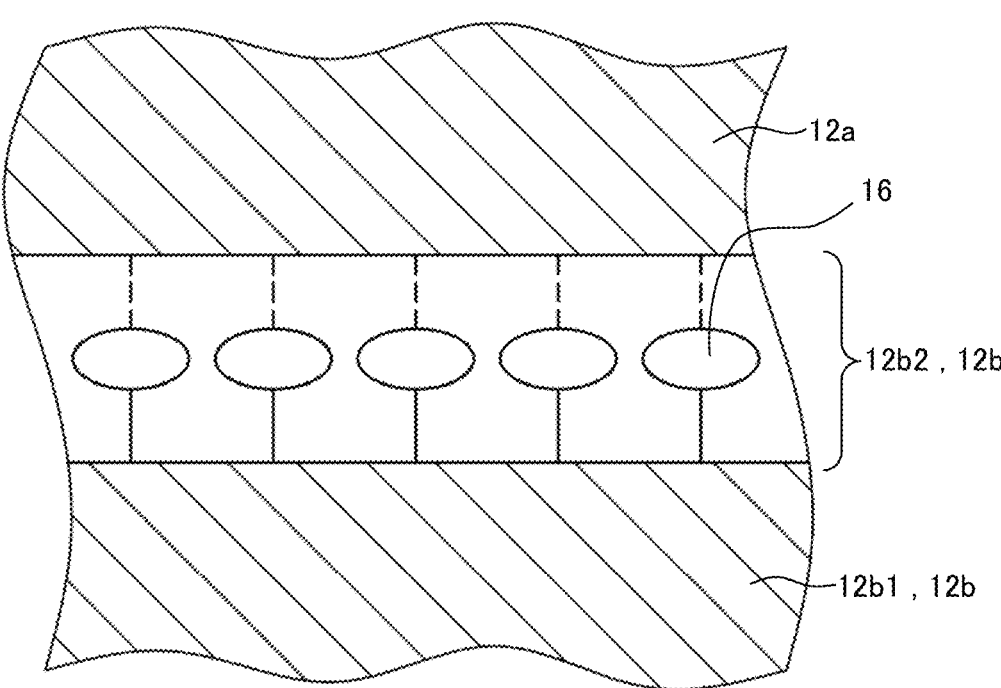
FIG. 7 is a sectional view showing an adhesion interface between a resin member and a metal particle.

The surface layer 12b2, details of which are described with reference to FIG. 7, is configured to increase the adhesion strength to the resin member 12a. The surface layer 12b2 is described with reference to FIG. 4B.

Figure 4B:
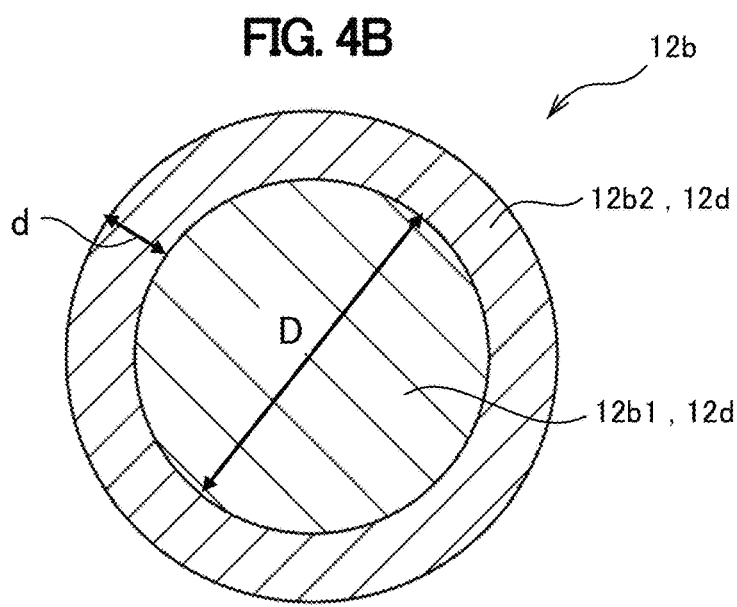
FIG. 4B is a cross-sectional view taken along a line A-A of FIG. 4A.

FIG. 4B is a cross-sectional view taken along a line A-A in FIG. 4A. As described above, each branch 12d is circular in cross section, and the core 12b1 has the diameter D. d is described later with reference to FIG. 7. The surface layer 12b2 is provided so as to cover the core 12b1. This allows the entire metal particle 12b to contribute to increasing the adhesion strength to the resin member 12a.

Back to FIG. 4A, the particle size of the metal particle 12b, which is not limited, is not less than 10 nm and not more than 300 μm, for example. The particle size of the metal particle 12b can be a sphere-equivalent particle size measured by a laser diffraction-type particle size distribution analyzer, for example.

Figure 5:
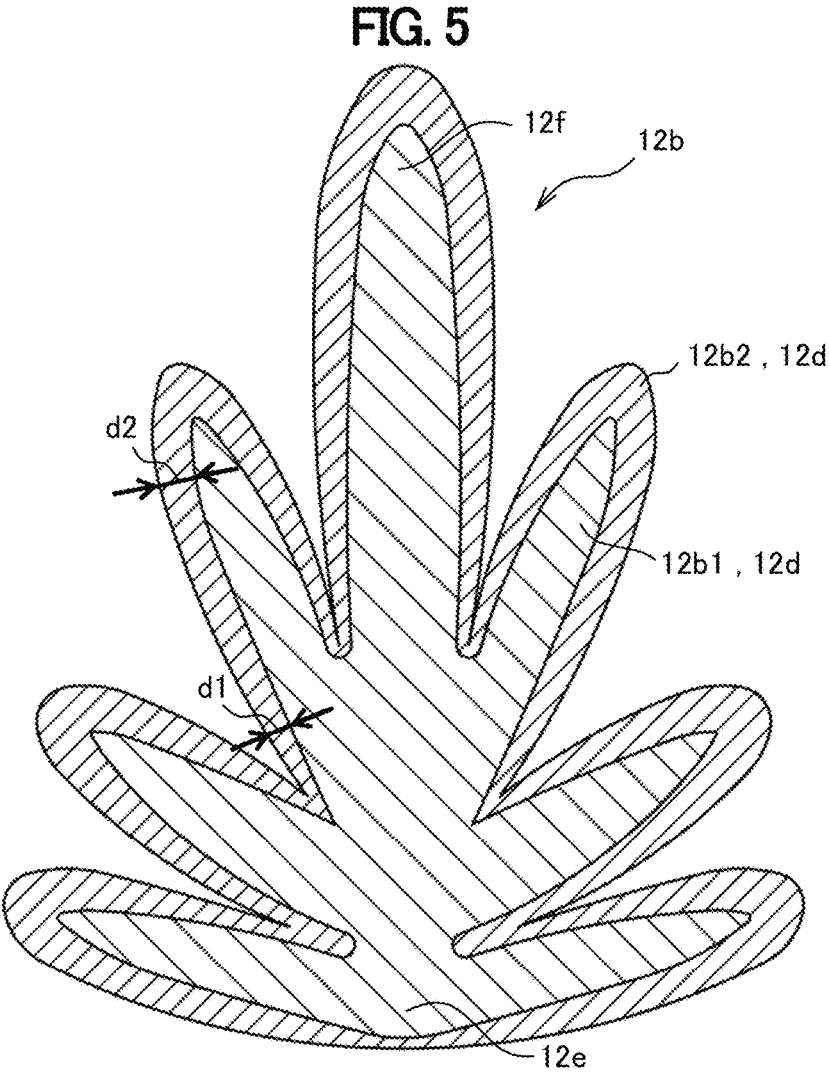
FIG. 5 is a sectional view of a dendritic metal particle according to another embodiment.

FIG. 5 is a sectional view of a dendritic metal particle 12b according to another embodiment. In the above-described metal particle 12b shown in FIGS. 4A and 4B, the thickness d of the surface layer 12b2 is the same across the metal particle 12. In the metal particle 12b shown in FIG. 5, the thickness of the surface layer 12b2 (a metal layer described later) increases toward tips 12f of the branches 12d that taper toward the tips 12f (that decrease in D shown in FIG. 4B). For example, in a certain one of the branches 12d, thickness d1 of the surface layer 12b2 on the connecting section 12e side is short while thickness d2 of the surface layer 12b2 on the tip 12f side is long.

At the tips 12f, which are thin and tend to have a low adhesion strength, the surface layer 12b2 is therefore thick and has a higher adhesion strength. Furthermore, in the manufacturing process of the metal particles 12b, since the amount of, for example, a conversion coating agent adhering to the thin tips 12f is small, the conversion coating agent tends to volatilize. Increasing the amount of conversion coating agent adhering to the metal particles 12b according to the surface layer 12b2 can reduce volatilization or the like.

Figure 6:
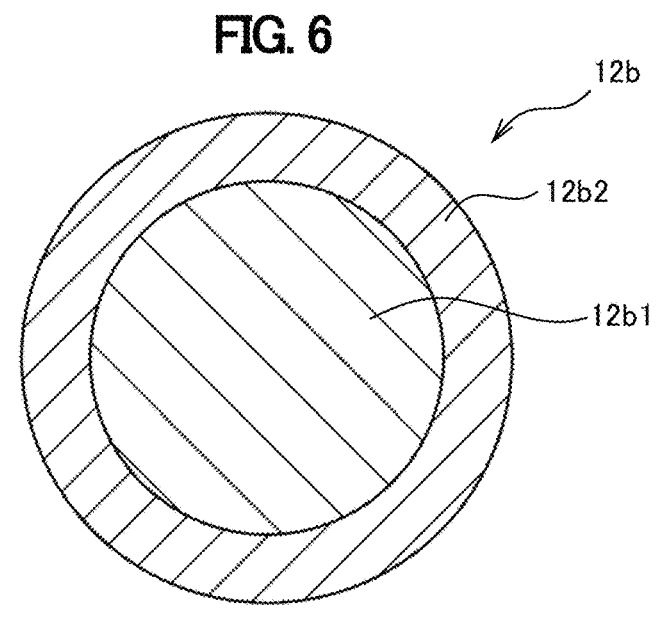
FIG. 6 is a sectional view of a spherical metal particle according to still another embodiment.

FIG. 6 is a sectional view of a spherical metal particle 12b according to still another embodiment. In this still another embodiment, the metal particle 12b has a spherical shape. The spherical shape herein does not need to be an exactly spherical shape and includes a substantially spherical form in which the difference between the longest diameter and the shortest diameter is not greater than 10% of the longest diameter.

In the spherical metal particle 12b, the surface layer 12b2 is formed to cover the entire surface of the spherical core 12b1. The surface layer 12b2 may be of uniform or non-uniform thickness. The surface of the core 12b1 may be composed of a smooth curved plane or may be uneven.

According to the spherical metal particle 12b, the metal particle 12b can be easily manufactured.

FIG. 7 is a sectional view showing an adhesion interface between the resin member 12a and the metal particle 12b. In the surface of the metal particle 12b, as described above, the surface layer 12b2 is formed in order to increase the adhesion strength of the metal particle 12b to the resin member 12a. The surface layer 12b2 therefore has a higher adhesion strength to the resin member 12a than the core 12b1.

For example, the sliding material described in Patent Literature 1 includes the resin member 12a added with an oxide material, such as alumina particles, diatomite particles, or the like. Such particles are likely to fall off when repeatedly subjected to shear force, and the fallen particles serve as abrasive particles having a cutting operation, which can spread wear. The surface layer 12b2 is therefore formed in the surface of the metal particle 12b in order to increase the adhesion strength of the metal particle 12b to the resin member 12a. The metal particle 12b is thereby less likely to fall off even when repeatedly subjected to shear force. This improves the wear resistance of the sliding material 12.

The surface layer 12b2 includes affinity portions 16 having an affinity to the resin member 12a. Including the affinity portions 16 increases the adhesion strength between the surface layer 12b2 and the resin member 12a and prevents the metal particles 12b from falling off the resin member 12*a*. Having an affinity herein refers to a situation between the affinity portions 16 and the resin member 12*a*, in which electron pairs are shared, the Coulomb force produces attraction, electrons are coordinated in an empty electron orbital, or electrically charged hydrogen produces attraction or another similar situation.

The affinity portions 16 contain at least one of a functional group including oxygen and a transition metal having an affinity to the resin member 12*a*. Containing these materials produces adhesion forces (indicated by dashed lines in FIG. 7) by chemical bonds, such as covalent bonds, ionic bonds, coordinate covalent bonds, or hydrogen bonds, between the resin member 12*a* and affinity portions 16, thus increasing the adhesion strength.

The surface layer 12*b*2 is a conversion coating layer that is formed by a conversion coating process to increase the affinity to the resin member 12*a*. Specifically, the surface layer 12*b*2 is a coupling layer that couples organic and inorganic substances or a metal layer, for example. The metal layer is a plating layer, a vapor-deposited layer, or the like, for example. Since the surface layer 12*b*2 can be formed by a conversion coating process, such as coupling, plating, or vapor deposition, for the core 12*b*1, the surface layer 12*b*2 is easily formed.

When the surface layer 12*b* is a metal layer, the thickness d of the surface layer 12*b*2 in FIG. 4B described above is not less than 1/10000 and not greater than 1/100 of the particle size of the metal particle 12*b*, for example. When the thickness d is set in this range, the thickness d of the surface layer 12*b*2 is small enough compared to the particle size of the metal particles 12*b*.

When the thickness d is in this range, preferably, the surface layer 12*b*2 is a metal layer composed of a metal having a higher hardness than the inner wall 41*a* of the cylinder 41 while the core 12*b*1 is composed of a material having a lower hardness than the inner wall 41*a* of the cylinder 41. When the surface layer 12*b*2 has a higher hardness than the inner wall 41*a* (FIG. 2), setting the thickness d of the surface layer 12*b*2 in the aforementioned range allows the core 12*b*1 having a low hardness to absorb stress applied to the metal particle 12*b*. The wear resistance of the sliding material 12 can be therefore improved.

When the surface layer 12*b*2 is a coupling layer 12*b*2, the thickness d, which cannot be measured, is a thickness corresponding to one molecule, for example and specifically is thought to be about 1 to 3 nm, for example.

The thickness d of the surface layer 12*b*2 is the same throughout the entire metal particle 12*b*. The "being the same" herein does not need to represent "being exactly the same" and, in light of measurement errors and production variation, includes a form in which the difference between the largest thickness and the smallest thickness is not greater than 10% of the largest thickness, for example. The entire metal particle 12*b* therefore can adhere to the resin member 12*a* with equal strength.

Back to FIG. 3, the sliding material 12 includes the rod-shaped particles 12*c*. The rod-shaped particles 12*c* can increase the strength of the resin member 12*a*. The rod-shaped particles 12*c* are fiber-like particles, for example, and are at least one type from carbon fibers, glass fibers, metal fibers, ceramic fibers, and the like. Among these fibers, the rod-shaped particles 12*c* are preferably carbon fibers or glass fibers. Since carbon and glass fibers are lightweight, the sliding material 12 can be reduced in weight.

In addition to the aforementioned metal particles 12*b* and rod-shaped particles 12*c*, the sliding material 12 may contain a solid lubricant material, such as molybdenum disulfide or boron nitride, for example.

The presence of the metal particles 12*b* and surface layer 12*b*2 can be confirmed by a chemical analysis for the surface of the sliding material 12 or fragments thereof. The chemical analysis is X-ray fluorescence spectroscopy, energy-dispersive X-ray spectroscopy, infrared spectroscopy, or X-ray photoelectron spectroscopy, for example.

The sliding material 12 can be manufactured as follows. For the dendritic metal particles 12*b*, for example, the dendritic cores 12*b*1 are obtained by electrolyzing an aqueous solution containing metal ions that constitute the cores 12*b*1 for precipitation of dendritic particles, for example. Then the surface layers 12*b*2 are formed in the obtained cores 12*b*1 by a conversion coating process. The metal particles 12*b* including the surface layers 12*b*2 are thus manufactured.

Coupling and plating processes as examples of the conversion coating process are performed as follows. The coupling process may use a titanium-based coupling agent, a silicon-based coupling agent, or the like. The coupling agent contains in the molecule, functional groups that bind to organic and inorganic materials and serves to connect the organic material, like the resin member 12*a*, and the inorganic material, like the metal particles 12*b*. This coupling agent therefore increases the adhesion strength, improving the wear resistance of a composite material like the sliding material 12.

Specific examples of the coupling agent are compounds containing an organic functional group and an alkoxy group in the molecule. The titanium-based coupling agent may be an alkyl titanate-based coupling agent, including tetraisopropyl titanate, tetra normal butyl titanate, butyl titanate dimer, tetraoctyl titanate, tetrastearyl titanate, titanium lactate ammonium salt, or titanium lactate. The silicon-based coupling agent may be vinyltrimethoxysilane, 2-(3,4-epoxycyclohexyl)ethyltrimethoxysilane, p-styryltrimethoxysilane, 3-methacryloxypropylmethyldimethoxysilane, 3-acryloxypropyltrimethoxysilane, N-2-(aminoethyl)-3-aminopropylmethyldimethoxysilane, tris-(trimethoxysilylpropyl)isocyanurate, 3-ureidopropyltrialkoxysilane, 3-mercaptopropylmethyldimethoxysilane, 3-isocyanatopropyltriethoxysilane, or the like. These coupling agents each can be used alone or in combination with one or more agents from these coupling agents.

The coupling process for the cores 12*b*1 is performed by dissolving the coupling agent in a proper aqueous solvent, a non-aqueous solvent, or a mixture solvent and dispersing the cores 12*b*1 in the resulting solution, followed by stirring for several hours to several days, for example. The metal particles 12*b* including the cores 12*b*1 with the surface layer 12*b*2 formed thereon are thereby obtained.

The plating process for the cores 12*b*1 can be performed using a transition metal having a high chemical affinity to the cores 12*b*1, such as nickel plating, iron plating, or the like.

The dendritic metal particles 12*b* in which the metal layer, as the surface layer 12*b*2, increases in thickness toward the respective tips 12*f* as shown in FIG. 5 can be precipitated by an electrolysis of an aqueous solution containing the metal ions thereof. The metal particles 12*b* as shown in FIG. 5 can be manufactured by controlling the current, voltage, stirring manner, additive types, metal ions' complex structure, and the like of the electrolysis process, for example.

The metal particles 12*b* prepared as described above, powder, for example, of the material constituting the resin member 12*a*, the rod-shaped particles 12*c*, the solid lubricant, and the like are uniformly mixed with a mixer to form a mixture. The mixture is molded into any shape by compression or injection molding to form a molded product, and the molded product is fired in an electric furnace or the like. The sliding material 12 is thus manufactured. Preferably, the firing is performed in a temperature range properly adjusted depending on the material constituting the resin member 12a.

In the sliding material 12 that can be manufactured as described above, the surface layers 12b2 of the metal particles 12b increases the adhesion strength between the metal particles 12b and resin member 12a as described above. The metal particles 12b are therefore less likely to fall off the resin material 12a even when the sliding material 12 is sliding. This reduces wear of the sliding material 12 due to its sliding on the fallen metal particles 12b and improves the wear resistance of the sliding material 12, extending the maintenance cycle and the life of the compressor 40.

Figure 8:
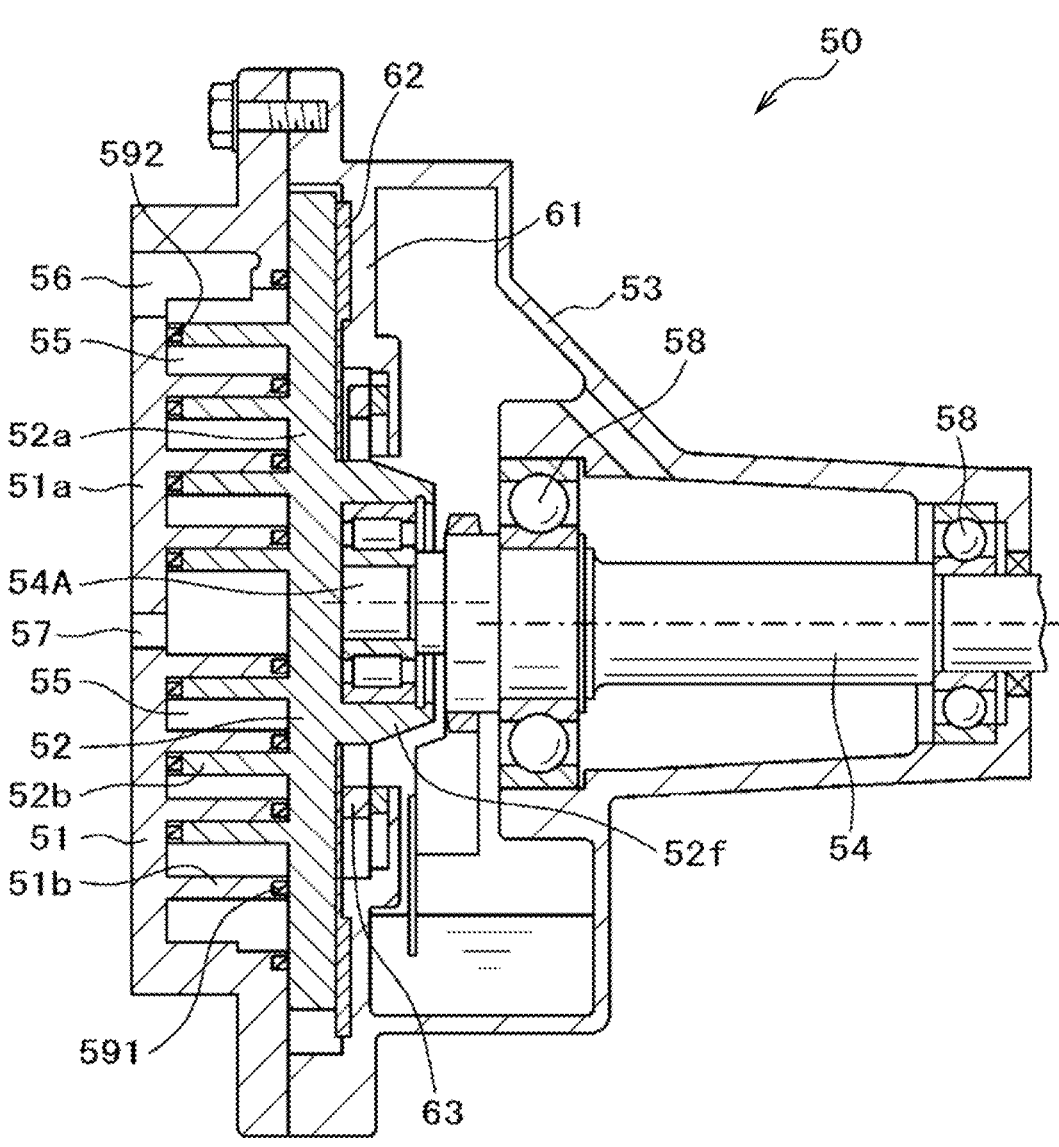
FIG. 8 is a sectional view showing the entire configuration of a scroll compressor.

FIG. 8 is a sectional view showing the entire configuration of a scroll compressor 50. The compressor 50 includes: a casing 53 constituting an outer shell of the compressor 50; a driving shaft 54 rotatably provided on the casing 53; a fixed scroll 51 mounted on the casing 53; and an orbiting scroll 52 provided on a crank shaft 54A of the driving shaft 54 so as to orbit.

The fixed scroll 51 includes: a fixed end plate 51a; and a fixed scroll wrap 51b that has a spiral form and is provided on one major surface side of the fixed end plate 51a. The orbiting scroll 52 includes: an orbiting end plate 52a; and an orbiting scroll wrap 52b that has a spiral form and is provided on one major surface side of the orbiting end plate 52a. The orbiting scroll 52 includes a boss section 52f protruding at the center of the back side of the orbiting end plate 52a.

The orbiting scroll 52 is located such that the orbiting scroll wrap 52b and the fixed scroll wrap 51b face each other so as to engage with each other. Compression chambers 55 as an operating space for compressing gas are thereby formed between the fixed and orbiting scroll wraps 51b and 52b.

In the outer periphery of the fixed end plate 51a of the fixed scroll 51, a suction port 56 is drilled. The suction port 56 communicates with the outermost compression chamber 55. At the center of the fixed end plate 51a of the fixed scroll 51, a discharge port 57 is drilled. The discharge port 57 is opened to the innermost compression chamber 55.

The driving shaft 54 is rotatably supported on the casing 53 through ball bearings 58. One end of the driving shaft 54 is coupled to an electric motor (not shown) or the like outside the casing 53 while the other end of the driving shaft 54 extends in the casing 53 to serve as the crank shaft 54A. The axis of the crank shaft 54A is deviated from the axis of the driving shaft 54 by a predetermined dimension.

On the inner circumference of the casing 53 on the orbiting scroll 52 side, an annular thrust bearing section 61 is provided. Between the thrust bearing section 61 and the orbiting end plate 52a, a thrust plate 62 is provided. The thrust plate 62 is formed as an annular plate made of a metal material, such as iron, for example. When the orbiting scroll 52 orbits, the surface of the thrust plate 62 slides on the orbiting end plate 52a. The thrust plate 62 and thrust bearing section 61 receive load acting on the orbiting scroll 52 in a thrust direction (in a direction where the orbiting scroll 52 separates from the fixed scroll 51) mainly during the compression operation. This reduces galling and abnormal wear caused in the casing 53 and orbiting end plate 52a.

Between the thrust bearing section 61 and orbiting end plate 52a, an Oldham ring 63 is provided at a position closer to the center than the thrust plate 62. When the orbiting scroll 52 is rotationally driven by the driving shaft 54, the Oldham ring 63 prevents the orbiting scroll 52 from rotating and gives the orbiting scroll 52a circular motion having an orbiting radius of a predetermined dimension due to the crank shaft 54A.

When the driving shaft 54 is rotationally driven by a not-shown electric motor or the like, the orbiting scroll 52 orbits with an orbiting radius of the predetermined dimension. Outside air sucked through the suction port 56 is sequentially compressed in the compression chambers 55 defined between the fixed and orbiting scroll wraps 51b and 52b. This compressed air is discharged through the discharge port 57 of the fixed scroll 51 into an external air tank (not shown) or the like.

Figure 9:
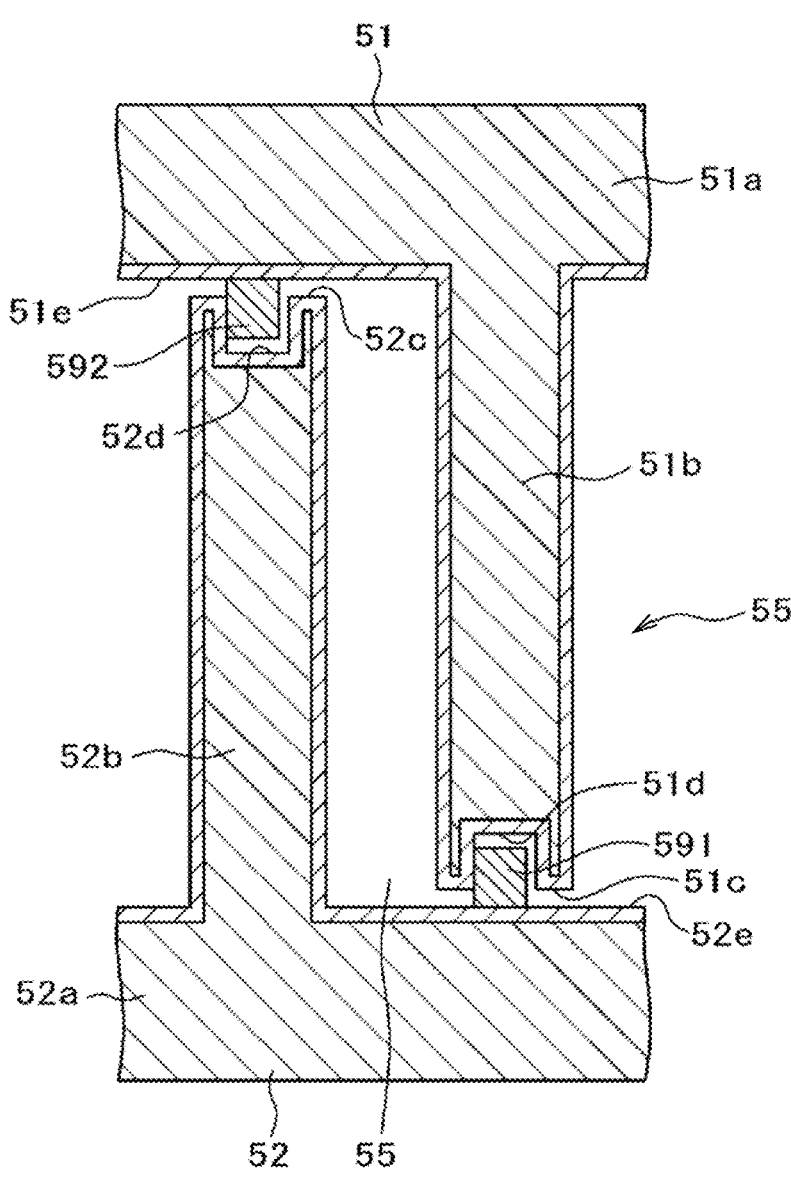
FIG. 9 is an enlarged view of portions of fixed and orbiting scrolls facing each other.

FIG. 9 is an enlarged view of portions of the fixed orbiting scrolls 51 and 52 facing each other. In an end face 51c of the fixed scroll wrap 51b that faces the orbiting end plate 52a, a groove 51d is formed. In this groove 51d, a tip seal 591 is fitted. In an end face 52c of the orbiting scroll wrap 52b that faces the fixed end plate 51a, a groove 52d is formed similarly. In this groove 52d, a tip seal 592 is fitted. The tip seals 591 and 592 both are examples of the sliding material 12 (FIG. 3). The above description about the sliding material 12 is therefore similarly applied to the tip seals 591 and 592.

A bottom-land surface 52e (the inner wall) of the orbiting end plate 52a (the metal housing) and a bottom-land surface 51e (the inner wall) of the fixed end plate 51a (the metal housing) each include an oxide coating formed by aluminum anodizing. As the orbiting scroll 52 orbits, the tip seal 591 (the sliding material) slides on the anodized aluminum coating in the bottom-land surface 52e, and the tip seal 592 (the sliding material) slides on the anodized aluminum coating in the bottom-land surface 51e. This prevents the fixed scroll wrap 51b and the bottom-land surface 52e of the orbiting end plate 52a from coming into contact and prevents the orbiting scroll wrap 52b and the bottom-land surface 51e of the fixed end plate 51a from coming into contact, thus providing smooth slide.

In the compressor 50 (FIG. 8), the same sliding material (not shown) as the sliding material 12 may be formed in one of the surfaces of the thrust plate 62 (FIG. 8) and the orbiting end plate 52a that form sliding surfaces of the thrust plate 62 and orbiting end plate 52a. Although the thrust plate 62 is made of a metal material, such as iron, in the example shown in FIG. 8, the thrust plate 62 itself may be made of the same sliding material (not shown) as the sliding material 12.

In the above description, the thrust plate 62 and the Oldham ring 63 provided at the position closer to the center than the thrust plate 62 constitute a mechanism to prevent the orbiting scroll 52 from rotating. However, this rotation preventing mechanism is not limited to the above described mechanism and may be a different rotation preventing mechanism using an auxiliary crank (not shown) or the like, for example.

In the scroll compressor 50, the orbiting scroll 52 circulates, unlike the piston 42 (FIG. 1) reciprocating along an axis. The metal particles 12b (FIG. 3) contained in the tip seals 591 and 592 (the sliding material 12) are subjected to stress in various directions and therefore are likely to fall off. However, the metal particles 12b contained in the tip seals 591 and 592 include the surface layers 12b2 (FIG. 7) and thereby have a high adhesion strength to the resin member 12a. Even when the metal particles 12b are subjected to stress in various directions, therefore, the high adhesion strength of the metal particles 12b to the resin member 12a prevents the metal particles 12b from falling off. This improves the wear resistance of the tip seals 591 and 592, extending the maintenance cycle and the life of the compressor 40.

Figure 10:
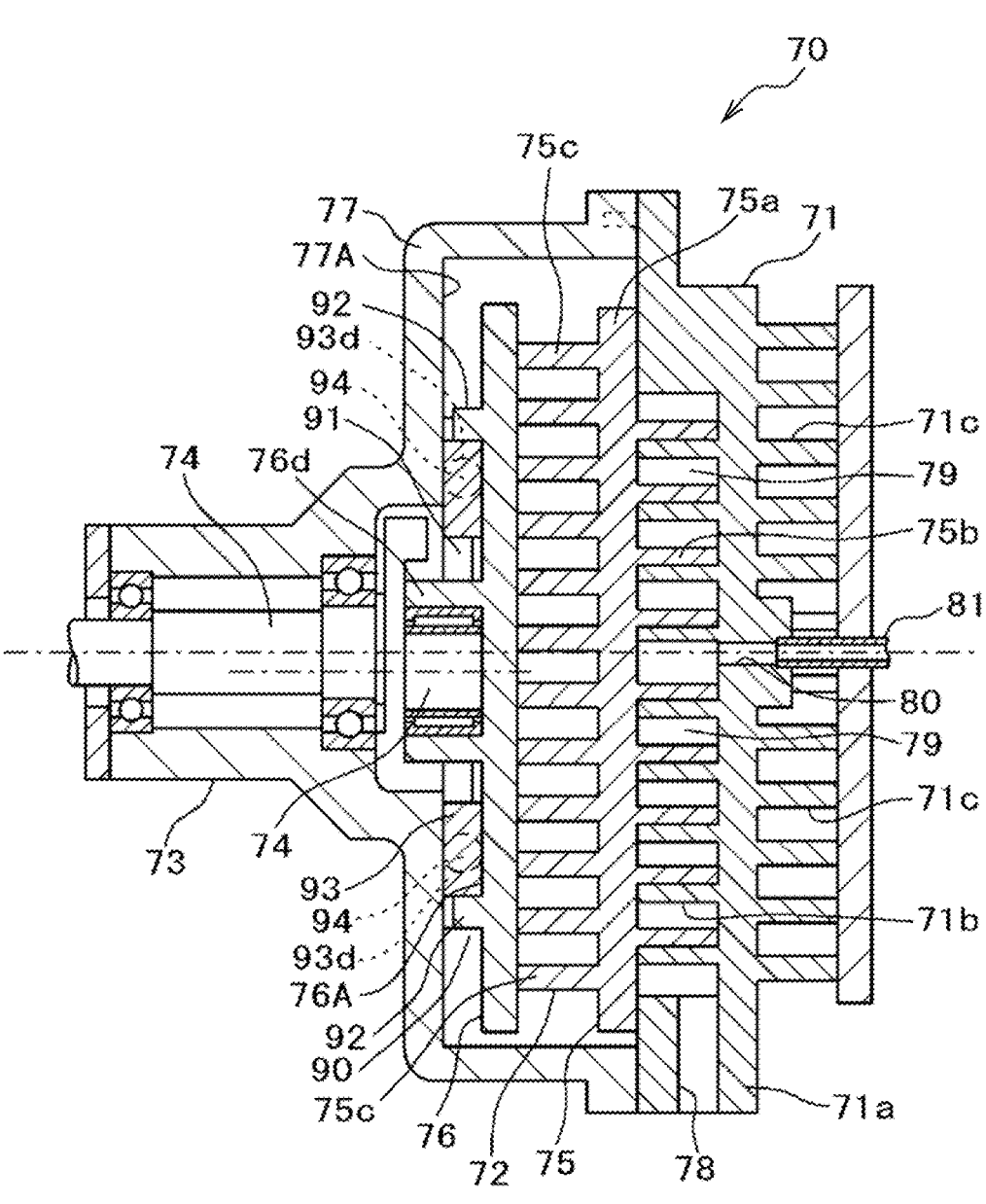
FIG. 10 is a sectional view of a scroll compressor including an Oldham coupling as a rotation preventing mechanism.

FIG. 10 is a sectional view of a scroll compressor 70 including an Oldham coupling 90 as the rotation preventing mechanism. The compressor 70 has the same basic configuration as the compressor 50 other than the Oldham coupling 90. In the following, different points from the compressor 50 are mainly described.

An orbiting scroll 72 includes an orbiting scroll body 75 and a substantially disk-shaped back plate 76 that is mounted on the back side of the orbiting scroll body 75. A fixed scroll 71 includes a fixed scroll wrap 71*b* on the front side of a fixed end plate 71*a* and a heatsink 71*c* on the back side of the fixed end plate 71*a*. The orbiting scroll body 75 includes: an orbiting scroll wrap 75*b* provided on the front side of an orbiting end plate 75*a* so as to face the fixed scroll wrap 71*b*; and a heatsink 75*c* provided on the back side of the orbiting plate 75*a*.

The back plate 76 is fastened to tip ends of the heatsink 75*c* of the orbiting scroll body 75 with a fixing member (not shown), such as a bolt. At the center of the back side of the back plate 76, a boss section 76*d* protrudes axially.

Figure 11:
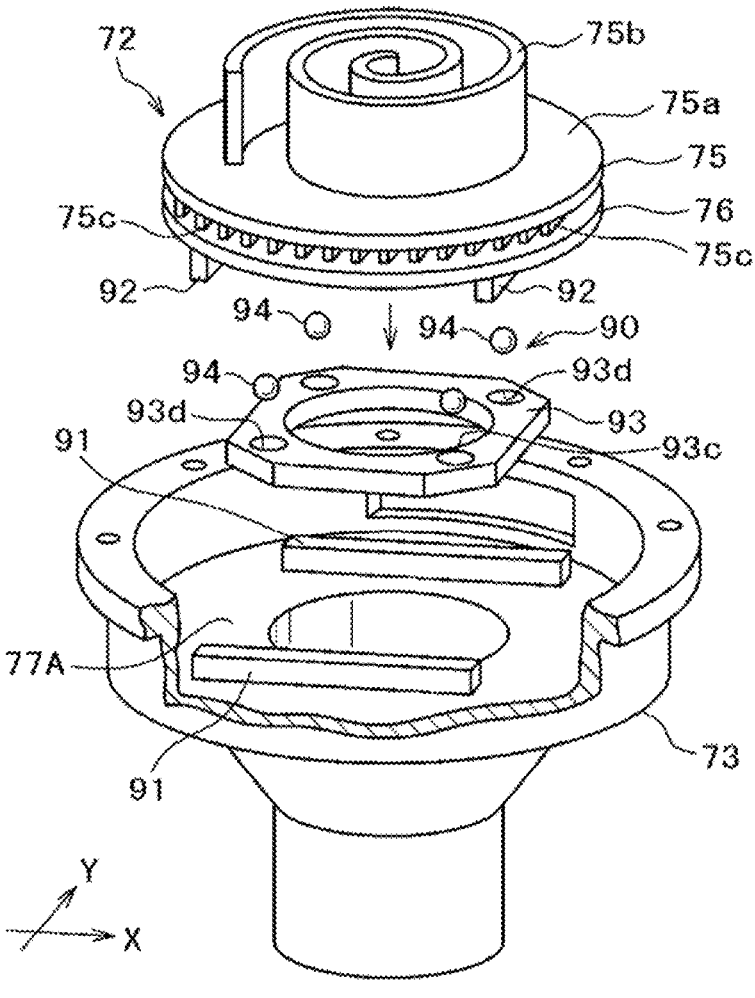
FIG. 11 is an exploded, perspective view showing a casing, an orbiting scroll, and the Oldham coupling.

FIG. 11 is an exploded, perspective view showing a casing 73, the orbiting scroll 72, and the Oldham coupling 90. Between the back plate 76 of the orbiting scroll 72 and a flange section 77 (FIG. 10) of the casing 73, the Oldham coupling 90 as the rotation preventing mechanism is provided. The Oldham coupling 90 includes X-axis guides 91 extending along an X-axis, Y-axis guides 92 extending along a Y-axis perpendicular to the X-axis, and spheres 94 located in a slider 93 that is in sliding contact with the X- and Y-axis guides 91 and 92.

The X- and Y-axis guides 91 and 92 are each formed in an elongated rectangular plate shape. The X-axis guides 91 are integrally provided on a sliding surface 77A of the flange section 77 (FIG. 10) of the casing 73 and are spaced a certain dimension apart from each other along the Y-axis. The Y-axis guides 92 are integrally provided on a sliding surface 76A of the back plate 76 and are spaced a certain dimension apart from each other along the X-axis.

Figure 12:
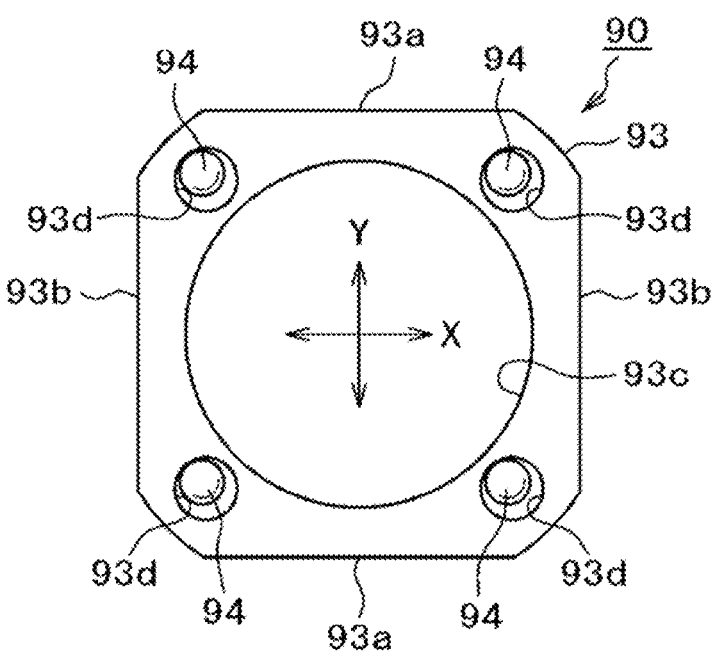
FIG. 12 is an enlarged view of the Oldham coupling.

FIG. 12 is an enlarged view of the Oldham coupling 90. The slider 93 is formed in a substantially square plate shape. The slider 93 is mounted so that side surfaces 93*a* be in sliding contact with the respective inner surfaces of the X-axis guides 91 (FIG. 11) and side surfaces 93*b* be in sliding contact with the respective inner surfaces of the Y-axis guides 92 (FIG. 11). In the center of the slider 93, a bypass hole 93*c* is drilled. The bypass hole 93*c* allows the boss section 76*d* (FIG. 10) of the back plate 76 (FIG. 11) to pass therethrough. At the four corners of the slider 93, through-holes 93*d* are individually drilled. In the through-holes 93*d*, the respective spheres 94 are inserted.

Back to FIG. 11, by causing the slider 93 to be slidingly displaced along the X-axis and Y-axis, the Oldham coupling 90 serves as a rotation preventing mechanism that prevents the orbiting scroll 72 from rotating and gives the orbiting scroll 72 a circular motion having an orbiting radius of a predetermined dimension. The slider 93 is an example of the sliding material 12 (FIG. 3), and the above description about the sliding material 12 is similarly applied to the slider 93. The sliding surface 76A (FIG. 10, the inner wall) of the back plate 76 (the metal housing) and the sliding surface 77A (the inner wall) of the casing 73 (the metal housing) each include an oxide coating formed by aluminum anodizing.

Back to FIG. 10, when the driving shaft 74 is rotationally driven by a not-shown electric motor or the like, the orbiting scroll 72 orbits with an orbiting radius of a predetermined dimension. Outside air sucked through the suction port 78 is sequentially compressed in compression chambers 79 defined between the fixed and orbiting scroll wraps 71*b* and 75*b*. This compressed air is discharged from a discharge port 80 of the fixed scroll 71 through a discharge pipe 81 and is reserved in an external tank (not shown).

As described above, the slider 93 corresponds to the sliding material 12 (FIG. 3). When both the X- and Y-axis guides 91 and 92 are made of metal and the slider 93 is made of resin, for example, however, only a part of the slider 93 constituting the sliding surface may be composed of the same material as the sliding material 12. Such a configuration also prevents the metal particles 12*b* (FIG. 3) from falling off the sliding surface.

When both the X- and Y-axis guides 91 and 92 are made of metal, the surfaces of the X- and Y-axis guides 91 and 92 may be composed of the same material as the sliding material 12. Alternatively, the X- and Y-axis guides 91 and 92 may be composed of the same material as the sliding material 12 while the slider 93 is made of metal.

In the compressor 70 including the Oldham coupling 90, the wear resistance of the slider 93 circulating can be improved similarly. This extends the maintenance cycle and the life of the compressor 70.

EXAMPLES

According to the following method, the metal particles 12*b* including the surface layers 12*b*2 were prepared, and the sliding material 12 was then prepared. The prepared sliding material 12 was subjected to friction tests according to the following method and was evaluated in terms of wear resistance.

Example 1

The metal particles 12*b* were obtained by first electrolyzing an aqueous solution containing copper ions for precipitation of dendritic particles to form the dendritic cores 12*b*1 made of copper; and then uniformly treating the surfaces of the cores 12*b*1 with an alkyl titanate-based coupling agent to uniformly form the surface layers 12*b*2 as the coupling layer containing titanium on the surfaces of the cores 12*b*1. The particle size of the metal particles 12*b* was about 50 μm, which was measured with a laser diffraction-type particle size distribution analyzer (the same applies hereinafter). The thickness of the surface layers 12*b*2 was thought to be about 1 to 3 nm.

The metal particles 12*b* were added with carbon fibers (the rod-shaped particles 12*c*, about 10 to 20 μm in diameter and about 100 to 200 μm in length) to form a mixture. The mixture was put into melted PTFE (the resin member 12*a*), which was then sufficiently kneaded and solidified. A sliding material (corresponding to the aforementioned sliding material 12) of Example 1 was thus prepared.

Comparative Example 1

A sliding material of Comparative Example 1 was prepared in a similar manner to Example 1 except that the surface layers 12*b*2 were not formed. The particle size of the metal particles contained in the sliding material of Comparative Example 1 was the same as that of Example 1.

Comparative Example 2

A sliding material of Comparative Example 2 was prepared in a similar manner to Example 1 except that the surface layers 12*b*2 were not formed and spherical metal particles were used. The particle size of the metal particles contained in the sliding material of Comparative Example 2 was the same as that of Example 1.

Friction Test

Figure 13:
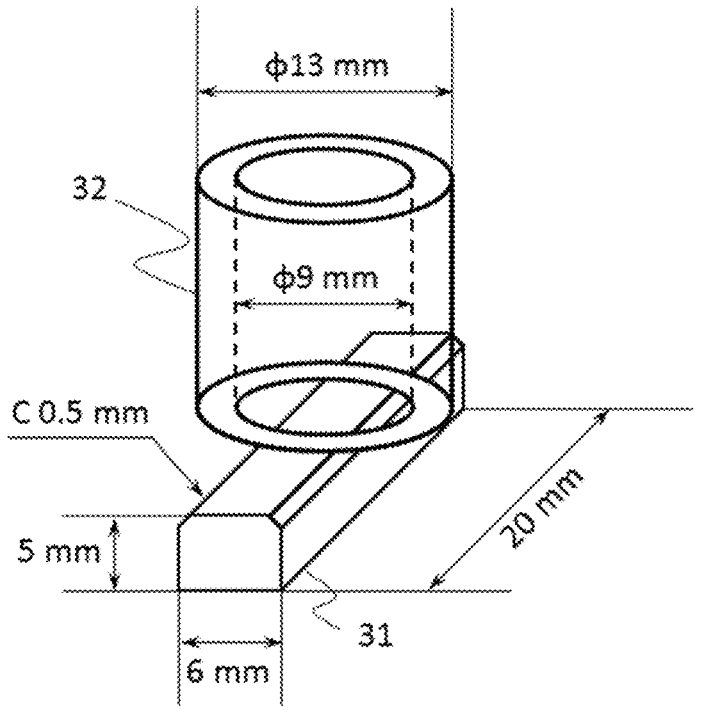
FIG. 13 is a diagram showing a friction test method.

FIG. 13 is a diagram showing a friction test method. The sliding materials of Example 1, Comparative Example 1, and Comparative Example 2 were processed into block test pieces 31. Each of the block test pieces 31 was a cuboid having a width of 6 mm, a height of 5 mm, and a length of 20 mm with upper two edges chamfered. The chamfering was performed such that each edge have a circular arc cross-section with a radius of 0.5 mm.

The upper surface of each block test piece 31 was brought into contact with a ring test piece 32 made of metal. The ring test piece 32 was made of an aluminum alloy. In the surface thereof, an oxide coating was formed by sulfuric acid anodizing. The ring test piece 32 is a cylinder with an outer diameter of 13 mm and an inner diameter of 9 mm. An end face of the ring test piece 32 was brought into contact with the upper surface of the block test piece 31.

With the block test piece 31 being in contact with the ring test piece 32, the ring test piece 32 was rotated and slid in the circumferential direction of the ring test piece 32 for a friction test. The ring test piece 32 was slid for 15 hours with the contact pressure, rotation speed, and temperature controlled to 1 MPa, 2 m/s, and 120° C., respectively. After the slide, the difference in mass between before and after the friction test is divided by the density to calculate abrasion volume losses for the sliding materials of Example 1 and Comparative Examples 1 and 2.

Figure 14:
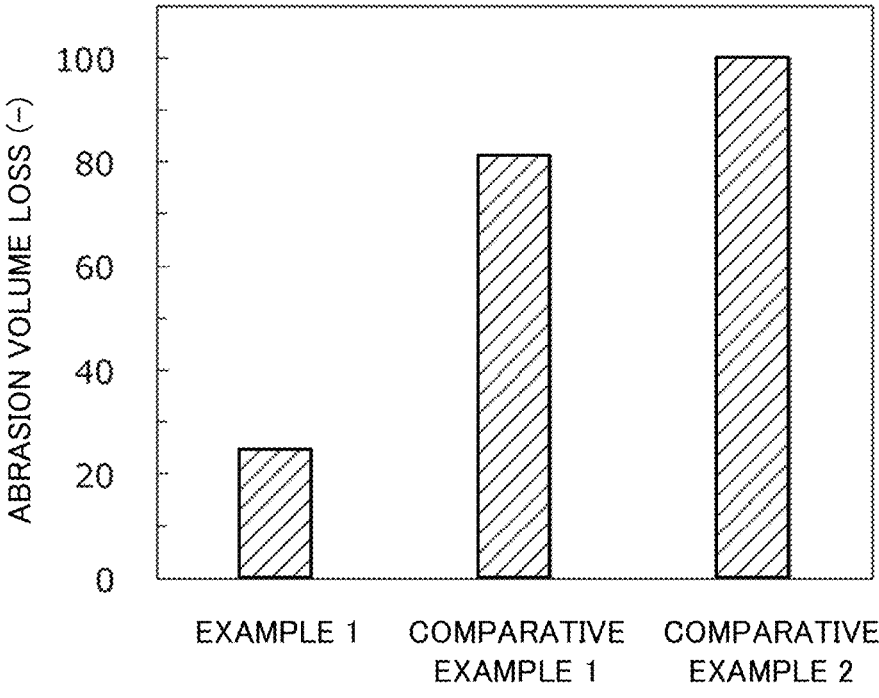
FIG. 14 is a diagram showing friction test results.

FIG. 14 is a diagram showing the friction test results. The abrasion volume losses of Example 1 and Comparative Example 1 were 25 and 80, respectively, where the abrasion volume loss of Comparative Example 2 was 100. Comparison between Example 1 and Comparative Example 1 shows that the formation of the surface layers 12*b*2 reduced the abrasion volume loss by approximately 70%. Comparison between Comparative Examples 1 and 2 shows that using the dendritic shape for the metal particles (Comparative Example 1) reduced the abrasion volume loss by 20% when compared to using the spherical shape (Comparative Example 2). Furthermore, if the surface layers 12*b*2 are formed in the surfaces of the spherical metal particles, which were not subjected to a friction test, the abrasion volume loss is thought to be reduced to about 100×0.7=30 although spherical particles fall off relatively easily.

The above value of 30 in this case is comparable to the value in Example 1. This means that the formation of the surface layers 12*b*2 can prevent the metal particles from falling off due to shear force during sliding and improve the wear resistance independently of the shape of the metal particles. In terms of the shape of the metal particles, it is revealed that the dendritic metal particles as shown in Example 1 can particularly reduce the abrasion volume loss and particularly improve the wear resistance.

Figure 15:
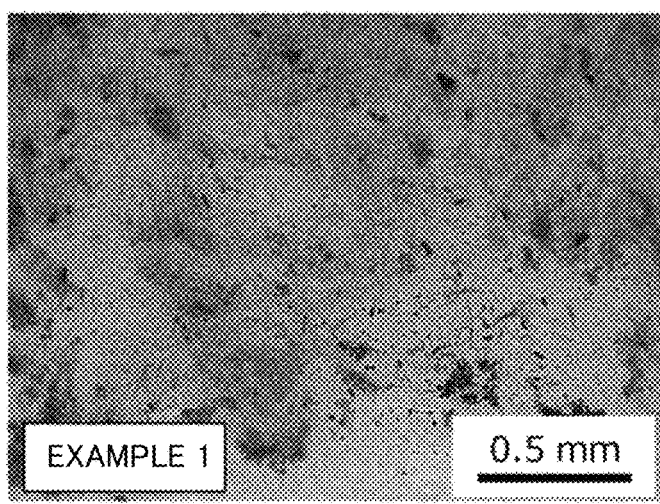
FIG. 15 is optical micrographs of abrasion powder produced at friction tests.
Figure 15:
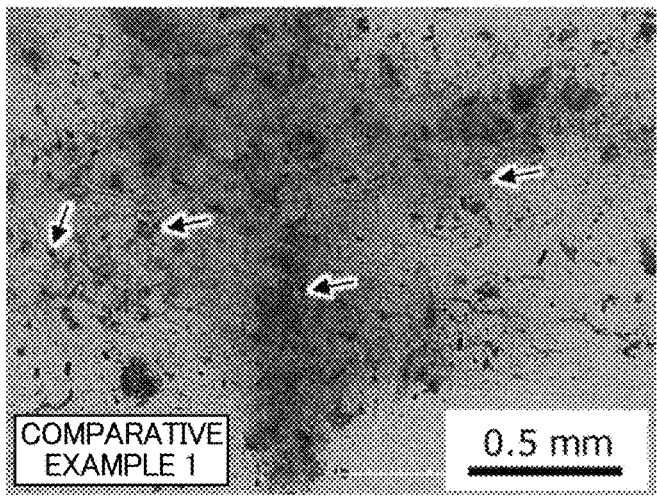
Figure 15:
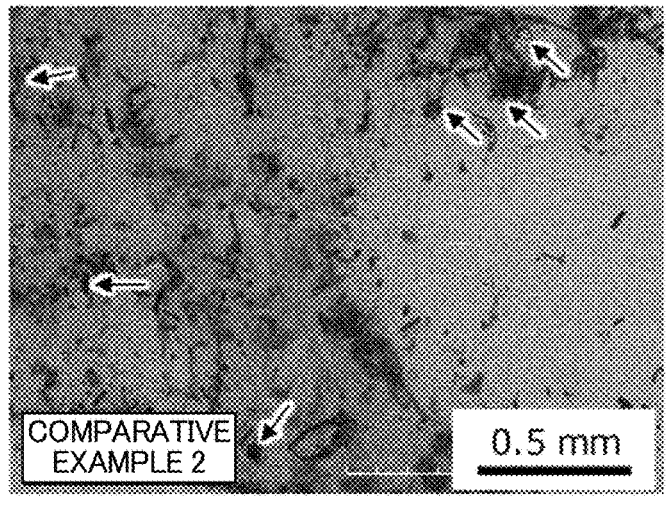

FIG. 15 is optical micrographs of abrasion powder resulting from the friction test. In FIG. 15, the upper micrograph is of Example 1, the middle micrograph is of Comparative Example 1, and the lower micrograph is of Comparative Example 2. In each micrograph, particles indicated by arrows are fallen metal particles. In Example 1, any fallen metal particles 12 were not observed. In Comparative Examples 1 and 2, metal particles were observed. The number of metal particles observed is larger in Comparative Example 2 in particular. These results correspond to the results in FIG. 14 described above showing that Example 1 had excellent wear resistance but Comparative Examples 1 and 2 had poor wear resistance, particularly Comparative Example 2 had poorer wear resistance.

As shown in FIGS. 14 and 15 above, when the sliding material 12 containing the metal particles 12*b* including the surface layers 12*b*2 is sliding, the metal particles 12*b* are prevented from falling off the sliding surface. It is therefore possible to reduce abrasive wear due to fallen metal particles and improve the wear resistance of the sliding material 12. For example, by applying the sliding material 12 to the piston ring and rider ring of a reciprocating compressor and to the tip seal and slider of a scroll compressor, the wear resistance thereof can be improved. This lengthens the replacement cycle of the piston ring, rider ring, tip seal, and slider, thus extending the maintenance cycle and the life of the compressor including a sliding section.

REFERENCE SIGNS LIST

12 SLIDING MATERIAL
12*a* RESIN MEMBER
12*b* METAL PARTICLE
12*b*1 CORE
12*b*2 SURFACE LAYER (COUPLING LAYER, METAL LAYER)
12*c* ROD-SHAPED PARTICLE
12*d* BRANCH
12*e* CONNECTING SECTION
12*f* TIP
16 AFFINITY PORTION
31 BLOCK TEST PIECE
32 RING TEST PIECE
40 COMPRESSOR (OIL-FREE COMPRESSOR)
41 CYLINDER (METAL HOUSING)
41*a* INNER WALL
41*b* OXIDE COATING
42 PISTON
421 PISTON RING (SLIDING MATERIAL)
422 RIDER RING (SLIDING MATERIAL)
43 COMPRESSION CHAMBER
44 PARTITION PLATE
44*a* SUCTION PORT
44*b* DISCHARGE PORT
44*c* SUCTION VALVE
44*d* DISCHARGE VALVE
45 HOUSING
46 CONNECTING ROD
46*a* PISTON PIN
47 MOTOR
48 PULLEY
49 BELT
50 COMPRESSOR (OIL-FREE COMPRESSOR)
51 FIXED SCROLL
51*a* FIXED END PLATE (METAL HOUSING)
51*b* FIXED SCROLL WRAP
51*c* END FACE
51*d* GROOVE
51*e* BOTTOM-LAND SURFACE (INNER WALL)
52 ORBITING SCROLL
52*a* ORBITING END PLATE (METAL HOUSING)
52*b* ORBITING SCROLL WRAP
52*c* END FACE
52*d* GROOVE
52*e* BOTTOM-LAND SURFACE (INNER WALL)
52*f* BOSS SECTION
53 CASING
54 DRIVING SHAFT

55 COMPRESSION CHAMBER
56 SUCTION PORT
57 DISCHARGE PORT
58 BALL BEARING
591, 592 TIP SEAL (SLIDING MATERIAL)
61 THRUST BEARING SECTION
62 THRUST PLATE
63 OLDHAM RING
70 COMPRESSOR (OIL-FREE COMPRESSOR)
71 FIXED SCROLL
71a FIXED END PLATE
71b FIXED SCROLL WRAP
71c HEATSINK
72 ORBITING SCROLL
73 CASING (METAL HOUSING)
74 DRIVING SHAFT
75 ORBITING SCROLL BODY
75a ORBITING END PLATE
75b ORBITING SCROLL WRAP
75c HEATSINK
76 BACK PLATE (METAL HOUSING)
76A SLIDING SURFACE (INNER WALL)
76d BOSS SECTION
77 FLANGE SECTION
77A SLIDING SURFACE (INNER WALL)
78 SUCTION PORT
79 COMPRESSION CHAMBER
80 DISCHARGE PORT
81 DISCHARGE PIPE
90 OLDHAM COUPLING
91 X-AXIS GUIDE
92 Y-AXIS GUIDE
93 SLIDER (SLIDING MATERIAL)
93a, 93b SIDE SURFACE
93c BYPASS HOLE
93d THROUGH-HOLE
94 SPHERE
D RADIUS
d1, d2 THICKNESS

The invention claimed is:

1. A compressor, comprising:
a compression chamber that is formed in a metal housing
and is configured to compress gas; and
a sliding material that is in contact with an inner wall of
the metal housing to form the compression chamber,
wherein
the sliding material includes:
a resin member; and
a metal particle that is located within the resin member
and includes a surface layer containing an affinity
portion having an affinity to the resin member,
wherein
the affinity portion contains a functional group con-
taining oxygen,
the surface layer is a coupling layer that couples
organic substances and inorganic substances,
the resin member is fluorine-based resin,
the surface layer has a thickness of not less than
$\frac{1}{10000}$ and not greater than $\frac{1}{100}$ of the particle size
of the metal particle,
a particle diameter of the metal particle is between
10 to 250 μm, and
the metal particle is made of copper or copper alloy.

2. The compressor according to claim 1, wherein the
affinity portion also contains a transition metal having an
affinity to the resin member.

3. The compressor according to claim 1, wherein
the metal particle includes the surface layer and a core
with the surface layer formed thereon,
the metal layer of the surface layer is composed of a metal
having a higher hardness than the inner wall of the
metal housing, and
the core is composed of a material having a lower
hardness than the inner wall of the metal housing.

4. The compressor according to claim 1, wherein the
metal particle is dendritic.

5. The compressor according to claim 4, wherein
the dendritic metal particle includes plural branches and a
connecting section connecting the plural branches, and
a metal layer as the surface layer increases in thickness
toward tips of the plural branches.

6. The compressor according to claim 1, wherein the
metal particle is spherical.

7. The compressor according to claim 1, wherein the
sliding material includes a rod-shaped particle.

8. The compressor according to claim 7, wherein the
rod-shaped particle is a carbon fiber or a glass fiber.

9. The compressor according to claim 1, wherein the
compressor is an oil-free compressor.

10. The compressor according to claim 1, wherein the
sliding material is one of a piston ring, a rider ring, a tip seal,
and a slider.

11. The compressor according to claim 1, wherein the
metal particle is dispersed at a proportion that is between
0.01 g of the metal particle and 10 g of the metal particle per
10 g of the resin member.

12. A compressor, comprising:
a compression chamber that is formed in a metal housing
and is configured to compress gas; and
a sliding material that is in contact with an inner wall of
the metal housing to form the compression chamber,
wherein
the sliding material includes:
a resin member; and
a metal particle that is located within the resin member
and includes a core and a surface layer which is
formed of the surface of the core and has a higher
adhesion strength to the resin member than the core,
wherein
the affinity portion contains a functional group con-
taining oxygen,
the surface layer is a coupling layer that couples
organic substances and inorganic substances,
the resin member is fluorine-based resin,
the surface layer has a thickness of not less than
$\frac{1}{10000}$ and not greater than $\frac{1}{100}$ of the particle size
of the metal particle,
a particle diameter of the metal particle is between
10 to 250 μm, and
the metal particle is made of copper or copper alloy.

13. A compressor, comprising:
a compression chamber that is formed in a metal housing
and is configured to compress gas; and
a sliding material that is in contact with an inner wall of
the metal housing to form the compression chamber,
wherein
the sliding material includes:
a resin member; and
a metal particle that is located within the resin member
and includes a surface layer formed by a conversion
coating process to enhance the affinity to the resin
member, wherein the affinity portion contains a functional group containing oxygen, the surface layer is a coupling layer that couples organic substances and inorganic substances, the resin member is fluorine-based resin, the surface layer has a thickness of not less than $\frac{1}{10000}$ and not greater than $\frac{1}{100}$ of the particle size of the metal particle, a particle diameter of the metal particle is between 10 to 250 μm, and the metal particle is made of copper or copper alloy.

\* \* \* \* \*